US007046800B1

(12) United States Patent
Tenca et al.

(10) Patent No.: US 7,046,800 B1
(45) Date of Patent: May 16, 2006

(54) SCALABLE METHODS AND APPARATUS FOR MONTGOMERY MULTIPLICATION

(75) Inventors: Alexandre F. Tenca, Corvallis, OR (US); Çetin K. Koç, Corvallis, OR (US)

(73) Assignee: State of Oregon Acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 940 days.

(21) Appl. No.: 09/621,020

(22) Filed: Jul. 21, 2000

Related U.S. Application Data

(60) Provisional application No. 60/193,676, filed on Mar. 31, 2000.

(51) Int. Cl.
*H04L 9/00* (2006.01)
*G06F 7/38* (2006.01)

(52) U.S. Cl. .......................................... 380/28; 708/491
(58) Field of Classification Search ................. 380/28; 708/491
See application file for complete search history.

(56) References Cited

U.S. PATENT DOCUMENTS

| | | | | |
|---|---|---|---|---|
| 5,745,398 A | * | 4/1998 | Monier | 708/492 |
| 6,240,436 B1 | * | 5/2001 | McGregor | 708/491 |
| 6,282,290 B1 | * | 8/2001 | Powell et al. | 380/28 |

OTHER PUBLICATIONS

Su et al, "An Improved Montgomery's Algorithm for High-Speed RSA Public-Key Cryptosystem", Jun. 2, 1999, IEEE Tranactions on Very Large Scale Integration (VLSI) Systems, vol. 7, No. 2, p. 280-284.*
Koc et al, "A Reduction Method for Multiplication in Finite Fields", Aug. 1998, Technical Report, p. 1-16.*
Menezes, J. et al., *Handbook of Applied Cryptography*, CRC Press, 1996, pp. 600-603.
Even, S., "Systolic Modular Multiplication," *Advances in Cryptology, Proceedings Crypto 90*, Lecture Notes in Computer Science, vol. 537, A. J. Menezes et al., eds. pp. 619-624 (1991).

(Continued)

*Primary Examiner*—Christopher Revak
(74) *Attorney, Agent, or Firm*—Klarquist Sparkman, LLP

(57) ABSTRACT

Scalable Montgomery multiplication methods and apparatus are provided that are reconfigurable to perform Montgomery multiplication on operands having arbitrary data precision. The methods perform Montgomery multiplication by combining bit-wise and word-wise operations and exhibit pipelined and parallel operation. Apparatus include a control unit that directs bits of an operand to processing elements that receive words of a second operand and a modulus, and produce intermediate values of a Montgomery product. After an intermediate value of a word of a Montgomery product is obtained in a first processing element based on a selected bit of the first operand, the intermediate value is directed to a second processing element and is updated based on another selected bit of the first operand.

16 Claims, 11 Drawing Sheets

OTHER PUBLICATIONS

Bosselaers, A. et al., "Comparison of three modular reduction functions," *Advances in Cryptology, Proceedings Crypto 93*, pp. 175-186 (1996).

Koç, Ç. et al., "Carry-Save Adders for Computing the Product AB Modulo N,"*Electron. Lett.*, 26:899-900 (1990).

Agnew, G. et al., "Arithmetic Operations in $GF(2^m)$," *J. of Cryptology*, pp. 3-13 (1993).

Koç, Ç. et al., "Analyzing and Comparing Montgomery Multiplication Algorithms," *IEEE Micro*, 16:26-33 (Jun. 1996).

Koç, Ç., "Montgomery reduction with even modulus," *IEE Proc.-Comput. Digit. Tech.*, 141:314-316 (Sep. 1994).

Paar, C., et al., "Fast Arithmetic Architectures for Public-Key Algorithms over Galois Fields $GF((2^n)^m)$," *Eurocrypt '97*, May 11, 1997, pp. 363-378.

Leu, J., et al., "A Scalable Low-Complexity Digit-Serial VLSI Architecture For RSA Cryptosytem," in *IEEE Workshop on Signal Processing Systems* 1999, pp. 586-595.

Bartee, T., et al., "Computation with Finite Fields," *Inform. and Control* 6:79-98 (1963).

Walter, C., "Faster Modular Multiplication by Operand Scaling," in *Advances in Cryptology Proc.Crypto '91*, LNCS 576, J. Feigenbaum, ed., 1992, pp. 313-323.

Bajard, J. et al., An RNS Montgomery Modular Multiplication Algorithm, *IEEE Trans. Computers* 47:766-776 (Jul. 1998).

Koç, Ç., et al., "Montgomery Multiplication in $GF(2^k)$," *Designs, Codes and Cryptography* 14:57-69 (Apr. 1998).

Naccache D., et al., "Cryptographic Smart Cards," IEEE Micro 16 :14-24 (1996).

Kaliski, Jr., B.S., "The Montgomery Inverse and Its Applications," *IEEE Trans. on Computers* 44:1064-1065 (Aug. 1995).

Montgomery, P.L., "Modular Multiplication Without Trial Division," *Math. of Computation* 44:519-521 (Apr. 1985).

Koç, Ç.K. et al., "Analyzing and Comparing Montgomery Multiplication Algorithms,"*IEEE Micro* 16:26-33 (Jun. 1996).

Dhem, J. et al., "SCALPS: Smart Card For Limited Payment Systems," *IEEE Micro* 16:42-51 (Jun. 1996).

Diffie, W., Hellman, M.E., "New Directions in Cryptography," *IEEE Trans. on Information Theory* 22:644-654 (1976).

Rivest, R.L. et al., "A Method for Obtaining Digital Signatures and Public-Key Cryptosystems," *Communications of the ACM* 21:120-126 (1978).

Koç, Ç.K., Acar, T., "Fast Software Exponentiation in $GF(2^k)$" in *Proceedings, 13th Symposium on Computer Arithmetic*, pp. 225-231 (Jul. 1997) (T. Lang et al., editors).

Hamano, T. et al., "$O(n)$-Depth Circuit Algorithm for Modular Exponentiation" in *Proceedings, 12th Symposium on Computer Arithmetic*, pp. 188-192 (Jul. 1995) (S. Knowles, W.H. McAllister, editors).

Orup, H., "Simplifying Quotient High radix Modular Multiplication" in *Proceedings, 12th Symposium on Computer Arithmetic*, pp. 193-199 (Jul. 1995) S. Knowles, W.H. McAllister, editors).

Bernal, A., Guyot, A., "Design of a Modular Multiplier Based on Montgomery's Algorithm" in *13th Conference on Design of Circuits and Integrated Systems*, pp. 680-685 (Nov. 1998).

Eldridge, S.E., Walter, C.D., "Hardware Implementation of Montgomery's Modular Multiplication Algorithm," *IEEE Trans. Computers* 42:693-699 (Jun. 1993).

Kornerup, P., "High-Radix Modular Multiplication for Cryptosystems" in *Proceedings, 11th Symposium on Computer Arithmetic*, pp. 277-283 (Jun. 1993) (E. Swartzlander et al., editors).

Walter, C.D., "Space/Time Trade-offs for Higher Radix Modular Multiplication Using Repeated Addition," *IEEE Trans. Computers* 46:139-141 (1997).

Royo, A., et al., "Design and Implementation of a Coprocessor for Cryptography Applications," *European Design and Test Conference*, pp. 213-217 (Mar. 1997).

Koç, Ç.K., Acar, T., Montgomery Multiplication in GF(2k), *Designs, Codes and Cryptography* 14:57-69 (1998).

Tenca, A.F., "Variable Long-Precision Arithmetic (VLPA) for Reconfigurable Coprocessor Architectures," Ph.D. Thesis, University of California at Los Angeles (Mar. 1998).

\* cited by examiner

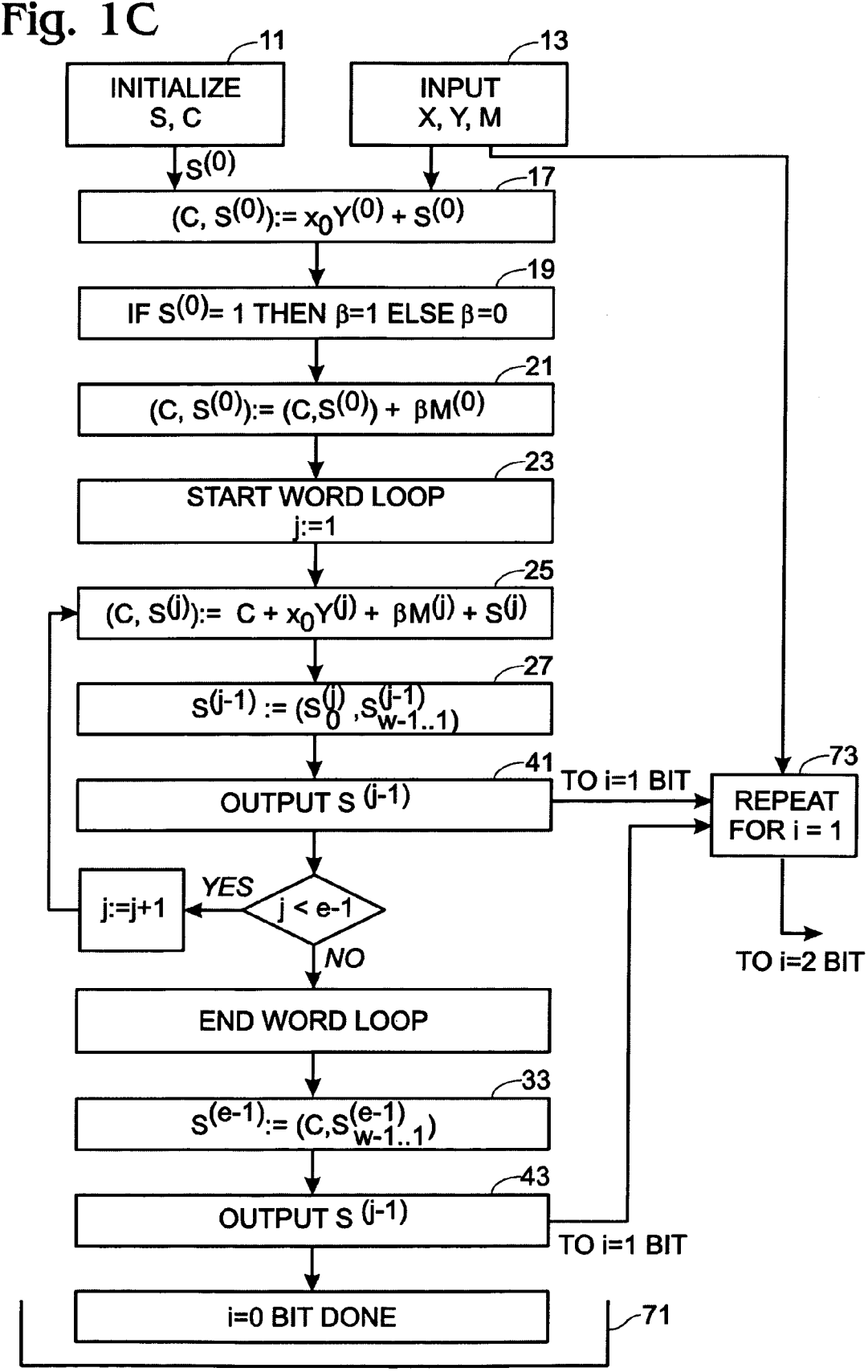

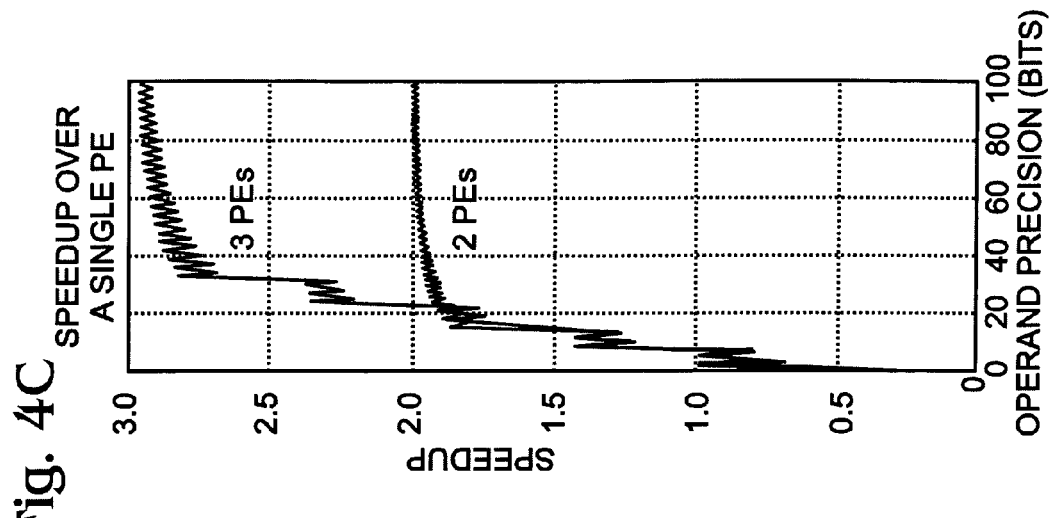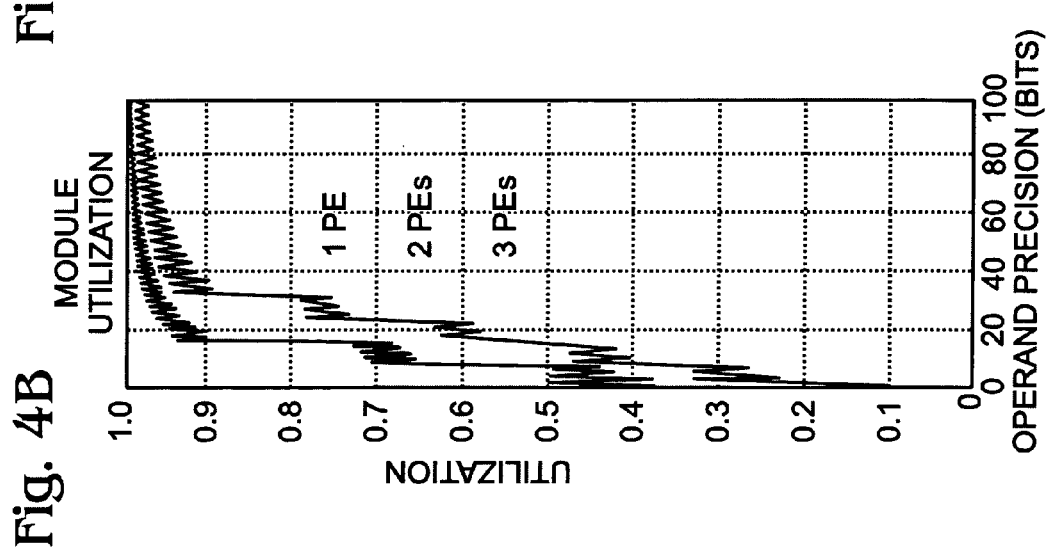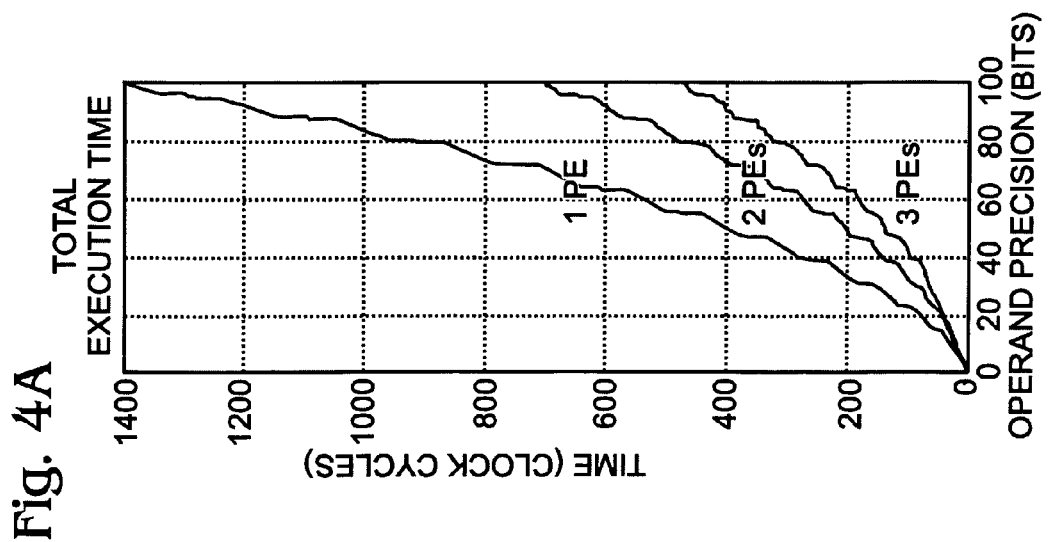

SCALABLE METHODS AND APPARATUS FOR MONTGOMERY MULTIPLICATION

This application claims the benefit of Provisional Application No. 60/193,676, filed Mar. 31, 2000.

FIELD OF THE INVENTION

The invention pertains to methods and apparatus for performing Montgomery multiplication.

BACKGROUND

Modular multiplication and modular exponentiation are important operations in many cryptographic systems. Modular multiplication involves finding a product c=ab and then dividing the product c by a modulus M to find a remainder that is referred to a modular product. The result of modular multiplication of a and b performed modulo-M is generally written as c≡ab mod M. The modular multiplication operation is also used to perform modular exponentiation.

Modular multiplication and exponentiation are used in the Diffie-Hellman and RSA public-key cryptosystems, described in, for example, W. Diffie and M. E. Hellman, "New Directions in Cryptography," *IEEE Trans. on Information Theory*, vol. 22, pp. 644–654 (1976), and R. L. Rivest, A. Shamir, and L. Adelman, "A Method for Obtaining Digital Signatures and Public-key Cryptosystems," *Communications of the ACM*, vol. 21, pp. 120–126 (1978). Modular multiplication is also used in elliptic key cryptography over the finite field $GF(2^k)$ and in discrete exponentiation over $GF(2^k)$. These applications are described in C. K. Koc and T. Acar, "Fast Software Exponentiation in $GF(2^k)$," in T. Lang, J. -M. Muller, and N. Takagi, eds., *Proceedings, 13th Symposium on Computer Arithmetic*, pp. 225–231 (Asilomar, Calif., Jul. 6–9, 1997).

While obtaining a product c=ab can be fast and efficient, the division by M used to obtain a modular product is slow and inefficient. One method of improving the speed and efficiency of modular multiplication (and exponentiation) is known as Montgomery multiplication and was first described in P. W. Montgomery, "Modular Multiplication Without Trial Division," *Math. of Computation*, vol. 44, pp. 519–521 (1985). Montgomery multiplication is particularly suitable for implementation on general-purpose computers, dedicated signal processors, or microprocessors. The method is based on a particular representation of the residue class modulo-M, and replaces the division by M operation with division by a power of 2. This latter operation is easily accomplished on a computer since numbers are typically represented in binary form and the division operation is a simple bit-shift operation. Applications of Montgomery multiplication are described in, for example, T. Hamano, N. Takagi, S. Yajima, and F. P Preparata, "O(n)-Depth Circuit Algorithm for Modular Exponentiation," in S. Knowles and W. H. McAllister, eds., *Proceedings, 12th Symposium on Computer Arithmetic*, pp. 188–192 (Bath, England, Jul. 19–21, 1995), and çK. Koç and T. Acar, "Fast Software Exponentiation in $GF(2^k)$" cited above.

In Montgomery multiplication, integers x and y that are elements of a complete residue set mod M are transformed to respective Montgomery images X and Y according to the transformation A≡ar mod M, wherein uppercase A denotes the Montgomery image of lowercase a and r is an integer such that gcd(r, M)=1. The Montgomery images X and Y are multiplied according to the Montgomery method to obtain a Montgomery product $Z \equiv XYr^{-1}$ mod M. A result z is then obtained by transforming the Montgomery image Z back into the complete residue set.

Montgomery multiplication is typically performed using a radix-2 algorithm in which the radix $r=2^n$. For m-bit operands $X=(x_{m-1}, \ldots x_1, x_0)$, Y, and a modulus M, a pseudocode representation of the radix-2 algorithm is:

$S_0=0$
for i=0 to m−1
  if $(S_i+x_iY)$ is even
    then $S_{i+1}:=(S_i+x_iY)/2$
    else $S_{i+1}:=(S_i+x_iY+M)/2$
  if $S_m \geq M$ then $S_m:S_m-M$, wherein the operands X and Y are Montgomery images of integers x and y. (Note that subscripted variables $x_i$ refer to bits of the Montgomery image X while the unsubscripted variable x denotes an element of the complete residue set.) This algorithm is adequate for hardware implementations because it is composed of simple operations such as word-by-bit multiplication, bit-shift (division by 2), and addition. The test of the even condition is also simple, consisting of checking the least significant bit of the partial sum $S_i+x_iY$ to determine if the addition of M is required. However, the operations are performed on full precision of the operands, and once hardware is defined for the m bits, the hardware does not work for operands having larger numbers of bits.

Given two integers X and Y (Montgomery images of x and y, respectively), the application of the radix-2 Montgomery multiplication (MM) algorithm with required parameters for n bits produces a Montgomery product Z:

$$Z=MM(X,Y)=XYr^{-1} \bmod M, \quad (1)$$

wherein $r=2^n$, and M is an integer in the range $2^{n-1}<M<2^n$. For cryptographic applications, M is usually a prime number or the product of two primes, and the condition that r and M be relatively prime, i.e., gcd(r, M)=1, is always satisfied.

Because the Montgomery method does not require division by M, the Montgomery method can be efficient, especially for operations in which repeated transformations to and from the complete residue set and the Montgomery images are not needed. Thus, Montgomery multiplication is especially attractive for exponentiation in which multiple Montgomery products are computed before transforming a result back to the complete residue set.

Various improvements to Montgomery multiplication have been suggested that offer increased efficiency in either hardware or software implementations. Some examples are described in H. Orup, "Simplifying Quotient Determination in High-radix Modular Multiplication," in S. Knowles and W. H. McAllister, eds., *Proceedings, 12th Symposium on Computer Arithmetic*, pp. 193–199 (Bath, England, Jul. 19–21, 1995); çK. Koç, T. Acar, and B. S. Kaliski Jr., "Analyzing and Comparing Montgomery Multiplication Algorithms," *IEEE Micro*, vol. 16, pp. 26–33 (1996); A. Bernal and A. Guyot, "Design of a Modular Multiplier Based on Montgomery's Algorithm," in 13*th Conference on Design of Circuits and Integrated Systems*, pp. 680–685 (Madrid, Spain, Nov. 17–20, 1998); S. E. Eldridge and C. D. Walter, "Hardware Implementation of Montgomery's Modular Multiplication Algorithm," *IEEE Trans. Computers*, vol. 42, pp. 693–699, June, 1993; and P. Kornerup, "High-radix Modular Multiplication for Cryptosystems," in E. Swartzlander, Jr., M. J. Irwin, and G. Jullien, eds., *Proceedings, 11th Symposium on Computer Arithmetic*, pp. 277–283 (Windsor, Ontario, June 29–Jul. 2, 1993).

These improvements in Montgomery multiplication described in the above references generally require that the associated algorithms and hardware use limited precision operands or a high-radix. High-radix algorithms usually are complex and consume significant amounts of chip area, and circuits based on these algorithms do not necessarily provide a speed increase. A theoretical investigation of the design trade-offs for high-radix modular multipliers is given in C. D. Walter, "Space/Time Trade-offs for Higher Radix Modular Multiplication Using Repeated Addition," *IEEE Trans. Computers*, vol. 46), pp. 139–141 (1997) and an example of a radix-4 design is described in A. Royo et al., cited above. The increase in the radix forces the use of digit multipliers, and therefore more complex designs and longer clock cycle times.

Multipliers designed for operands having a specific number of bits generally cannot be used for operands having a different number of bits. For example, a 768-bit multiplier described by A. Royo, J. Moran, and J. C. Lopez, "Design and Implementation of a Coprocessor for Cryptography Applications," in *European Design and Test Conference*, pp. 213–217 (Paris, France, Mar. 17–20, 1997) cannot be used readily with operands having 1024 bits. Typically the functions performed in lower precision designs are not consistent with functions necessary for higher precision multiplication, and a new multiplier must be designed.

To make scalable hardware, a conventional solution uses software and standard digit multipliers. The algorithms for software computation of Montgomery multiplication are presented in $_c$K. Koç and T. Acar, "Montgomery Multiplication in $GF(2^k)$," *Designs, Codes and Cryptography*, vol. 14, pp. 57–69(1998), and $_c$K. Koc, T. Acar, and B. S. Kaliski Jr., "Analyzing and Comparing Montgomery Multiplication Algorithms," *IEEE Micro*, vol. 16, pp. 26–33 (1996). The complexity of software-oriented algorithms is much higher than the complexity of the radix-2 hardware implementation, and direct hardware implementations are unattractive.

For these reasons, improved Montgomery multiplication methods and apparatus are needed that provide scalability without increasing multiplier cost, execution time, or complexity.

SUMMARY OF THE INVENTION

Scalable Montgomery multiplication methods and apparatus are provided based on a scalable architecture in which Montgomery multiplication depends on the precision of input operands and not the precision of an associated apparatus. Such scalable methods and apparatus permit parallel and pipelined execution and are reconfigurable to accommodate operands of different precisions.

In representative methods of performing a Montgomery multiplication, a first operand and a second operand are received. The first operand is represented as at least two words and the second operand is represented as a series of bits. A Montgomery product of the first operand and the second operand is obtained by multiplying the words representing the first operand by the bits representing the second operand. In a representative embodiment, Montgomery multiplication is performed with respect to a modulus M that is represented with at least two words. In additional embodiments, a number of words for representing the first operand and the modulus is selected, and the method is implemented as computer-executable instructions stored in a computer-readable medium such as a disk or memory.

Methods of obtaining a Montgomery product of a first operand X and a second operand Y with respect to a modulus M, wherein X and Y are represented by m bits, are provided. A word length w and a number of words e are selected. The second operand and the modulus M are represented as e words of length w, wherein e is at least 2. An intermediate value of a first word of the Montgomery product is obtained based on a product of a word of the second operand and a bit of the first operand. In representative embodiments, a product of the word length w and the number of words e is $w \cdot e \geq m$. In additional embodiments, an intermediate value of a second word of the Montgomery product is obtained based on a product of a second word of the second operand and a second bit of the first operand that is processed in parallel with obtaining the intermediate value of the first word. In additional embodiments, the intermediate value of the first word of the Montgomery product is updated with a contribution from at least one product of a second selected bit of the first operand with at least a second selected word of the second operand. Computer-readable media are provided that include computer-executable instructions for performing these methods.

Methods for coding a plaintext or decoding a ciphertext are provided. In a representative example, a plaintext is represented as a series of binary bits and word-wise by bit-wise Montgomery multiplication of a digital representation of the plaintext with a multiplier is performed. In specific examples, the multiplier is the digital representation of the plaintext.

Methods for supplying a first operand and a second operand to a Montgomery multiplication module are provided. The methods include selecting a word length w and a number of words e and representing the second operand as e words of length w. Words of the second operand are delivered to the Montgomery multiplication module. In further embodiments, a modulus M is represented as e words of length w, and words of the modulus are delivered to the Montgomery multiplication module.

Apparatus for performing a Montgomery multiplication of a first operand and a second operand with respect to a modulus are provided. The apparatus includes a plurality of processing elements having inputs for words of the first operand, words of the modulus, an intermediate value of a word of a Montgomery product, and an input for a bit of the second operand. A control unit is provided that is situated and configured to direct words of the first operand, words of the modulus, and bits of the second operand to the processing elements. In additional embodiments, the apparatus includes a data path along which words of the first operand are delivered to the processing element. In other embodiments, the processing elements include task processors that receive words of the first operand and words of the modulus, and that produce intermediate values of word of a Montgomery product.

Circuits for obtaining a Montgomery product of first and second operands with respect to a modulus are provided. The circuits comprise at least a first processing element and a second processing element. Each of the processing elements includes inputs that receive words of the first operand and the modulus and outputs that deliver values of words of the Montgomery product. The circuits also comprise a data path configured to deliver values of words of the Montgomery product from the first processing element to the second processing element. Additional circuit embodiments includes an input that receives a value associated with a precision of the first and second operands. In other embodiments, the data path is configured to provide a first selected bit of the second operand to the first processing element, and a second selected bit of the second operand to the second processing element.

Task processors for obtaining a Montgomery product of a first operand and a second operand with respect to a modulus M are provided. The task processors comprise an input configured to receive a bit of the first operand, an input configured to receive a word of the second operand, and an input configured to receive a word of the modulus. A computational unit is provided that determines a contribution to a final or intermediate value of a word of the Montgomery product based on the received bit of the first operand and the received words of the second operand and the modulus. An output is provided that is configured to supply a final or intermediate value of the word of the Montgomery product.

These and other embodiments and features of the invention are described with reference to the accompanying drawings.

BRIEF DESCRIPTION OF THE DRAWINGS

FIG. 1C is a block diagram illustrating processing of a single bit of an operand according to the method of FIG. 1B.

FIGS. 4A–4C are graphs of execution time, utilization, and speedup as a function of operand precision for 1, 2, and 3 processing elements and a word size w=8 bits.

DETAILED DESCRIPTION

Figure 1A:
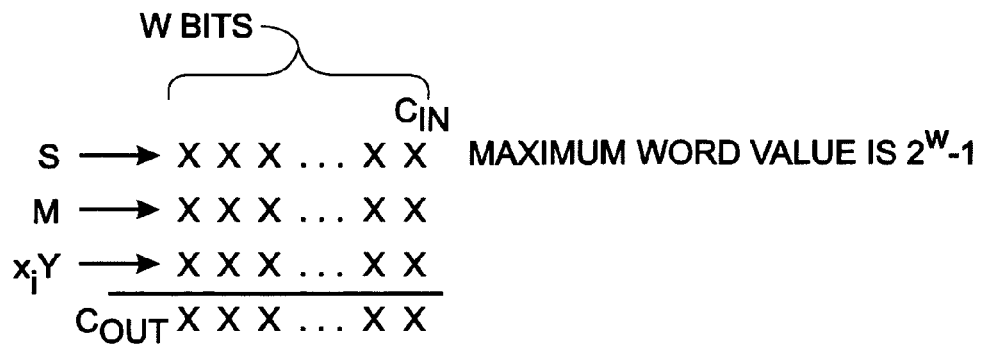
FIG. 1A is a schematic diagram illustrating use of a carry variable C.

Montgomery multiplication methods and apparatus are provided that are rescalable to accommodate operands of arbitrary precision. Operands are typically divided into words that are "shorter" than the operands, i.e., words having fewer bits than the operands, ("low precision") words. Such division of operands into words not only permits reconfigurable or scalable methods and apparatus but also permits propagation delay of high-fanout signals to be controlled. Therefore, this division of operands into words addresses the so-called "broadcast problem." The methods and apparatus provided are "word-oriented" and permit some parallel and pipelined computation of Montgomery products. As used herein, an arithmetic unit or other hardware or software apparatus or method is referred to as "scalable" if it can be reused or replicated in order to generate longer-precision results independently of its data-path precision.

Montgomery multiplication methods that perform bit-level computations and produce word-level outputs permit scalability. For example, operands X, Y that are to be Montgomery multiplied modulo-M and having m bits of precision are represented as concatenations of e words having w-bits, wherein a minimum number of words required is $e=\lceil(m+1)/w\rceil$ and a function $\lceil z \rceil$ denotes a smallest integer greater than or equal to z. An extra bit in e is needed since an intermediate value $(S_i+x_iY)$ of a radix-2 Montgomery multiplication algorithm is in the range [0, 2M−1]. Thus, computations are done with an extra bit of precision and the precision of the operands X, Y is extended by providing an additional leftmost bit (most significant bit) that is assigned a value of 0. Representative scalable Montgomery multiplication methods and apparatus described herein scan the operand Y ("multiplicand") word-by-word and the operand X ("multiplier") bit-by-bit. Such methods and apparatus provide efficient hardware and software implementations. Such methods are referred to herein as a multiple-word, radix-2 Montgomery multiplication methods ("MWR2MMs").

The modulus M and the operands Y, X (the multiplicand and the multiplier, respectively) are expressed as vectors as follows:

$M=(M^{(e-1)}, \ldots, M^{(1)}, M^{(0)})$
$Y=(Y^{(e-1)}, \ldots, Y^{(1)}, Y^{(0)})$
$X=(x_{m-1}, \ldots, x_1, x_2)$, wherein words are denoted with upper-case letters with superscripts, and bits are denoted with lower-case letters with subscripts. For example, $Y^{(i)}$ is an $i^{th}$ word of the multiplicand Y, and $x_j$ is a $j^{th}$ bit of the multiplier X. Each of the words $M^{(i)}$ and $Y^{(i)}$ includes w bits. A concatenation of vectors A and B is represented as (A, B). A range of bits of a vector A from a bit-position i to a bit-position j, wherein j>i, is represented as $A_{j..i}$. As used herein, a leftmost bit is a most significant bit. An $i^{th}$ bit of a $k^{th}$ word of A is represented as $A_i^{(k)}$. A rearrangement of the m-bit operand Y into e words having w bits is illustrated below:

$Y=(y_{m-1}, \ldots, y_0)$ $Y=(Y^{(e-1)}, \ldots, Y^{(1)}, Y^{(0)})$

The precision of the operand Y is extended by including an additional bit $y_m$ in an $e^{th}$ word $Y^{(e-1)}$. Bits of $M^{(e-1)}$ and $Y^{(e-1)}$ that are undefined in the original m-bit vectors are set to zero initially.

Table 1 contains a pseudocode representation of an MWR2MM method. In the pseudocode of Table 1, S is a Montgomery product or an intermediate value of a Montgomery product and includes e words. C is a carry variable. As used herein, S and $S^{(i)}$ refer to a Montgomery product or a word thereof, respectively, as well as to intermediate values produced while accumulating contributions from all bits and words of the operands during evaluation of the Montgomery product. As illustrated in Table 1, the product S is computed for each bit of X, scanning words of Y and M. After all words are scanned, another bit of X is selected, and the words of Y and M are scanned again. This method does not constrain the operands X, Y to any preselected precision. Arithmetic operations are performed in w-bit precision and are independent of the precision of the operands X, Y. The precision of the product is determined by the number of required bit and word loop iterations, e–1 and m, respectively. A total number of cycles used in the method of Table 1 is proportional to a product of the number of bits m in the operands and the number of words e into which the multiplicand Y is divided. In some cases, the resulting product S is greater than or equal to M, and is reduced by subtraction of M so that S:=S–M.

TABLE 1

Pseudocode representation of an MWR2MM method.

| | |
|---|---|
| S = 0 | initialize all words of S |
| for i = 0 to m – 1 { | begin bit loop |
| $\quad (C,S^{(0)}) := x_i Y^{(0)} + S^{(0)}$ | |
| $\quad$ if $S_0^{(0)} = 1$ then { | begin odd S |
| $\quad\quad (C,S^{(0)}) := (C,S^{(0)}) + M^{(0)}$ | |
| $\quad\quad$ for j = 1 to e – 1 { | begin word loop |
| $\quad\quad\quad (C,S^{(j)}) := C + x_i Y^{(j)} + M^{(j)} + S^{(j)}$ | |
| $\quad\quad\quad S^{(j-1)} := (S_0^{(j)}, S_{w-1\ldots 1}^{(j-1)})$ | |
| $\quad\quad$ } | end word loop |
| $\quad\quad S^{(e-1)} := (C, S_{w-1\ldots 1}^{(e-1)})$ | |
| $\quad$ } | end odd S |
| $\quad$ else { | begin even S |
| $\quad\quad$ for j = 1 to e – 1 { | begin word loop |
| $\quad\quad\quad (C,S^{(j)}) := C + x_i Y^{(j)} + S^{(j)}$ | |
| $\quad\quad\quad S^{(j-1)} := (S_0^{(j)}, S_{w-1\ldots 1}^{(j-1)})$ | |
| $\quad\quad$ } | end word loop |
| $\quad\quad S^{(e-1)} := (C, S_{w-1\ldots 1}^{(e-1)})$ | |
| $\quad$ } | end even S |
| } | end bit loop |

The pseudocode of Table 1 illustrates the use of the carry variable C that can have any of the values {0, 1, 2}. The number of bits required for the carry variable C is determined by a sum of words of S, M, and $x_i Y$. The addition of such words and use of the carry variable C is illustrated in FIG. 1A. The number of bits assigned to the carry variable C is determined so that the addition of three w-bit words and a maximum carry value $C_{max}$ from a previous word addition produces a carry value that can be contained in the bits of C. Therefore, the maximum carry value $C_{max}$ satisfies the following inequality:

$$3(2^w - 1) + C_{max} \leq C_{max} \leq C_{max} 2^w 2^w - 1,$$

so that $C_{max} \geq 2$. Selecting $C_{max} = 2$ satisfies this inequality and the carry variable C can be represented by two bits.

Because the bit loop (the loop over i) and the word loops (the loops over j) require current intermediate values of at least some of the words of the Montgomery product S, the bit loop and the word loops are not completely independent, restricting the extent to which these loops can be executed in parallel. However, a degree of parallel execution is possible for instructions in different word loops. Within the bit loop for i=1, intermediate values of words of the Montgomery product S are produced in the word loops. For example, after the appropriate (i.e., even or odd) word loop completes computation of $S^{(j)}$ for j=1, an intermediate value of a least significant word $S^{(0)}$ is obtained that can be used in computations with the bit $x_i$ for i=2. Therefore, execution of calculations for the bit $x_2$ can begin before completion of calculations for i=1, permitting at least some operations to be executed in parallel. Upon completing the word loop for j=2, a value of $S^{(1)}$ is available for calculations with the bit $x_2$. Calculations using the bit $x_2$ produces similar intermediate values of the words of S that can be used in calculations with the bit $x_i = x_3$. In general, a $j^{th}$ word loop produces an intermediate value of $S^{(j-1)}$ that is used in computations with a subsequent bit.

Figure 1F:
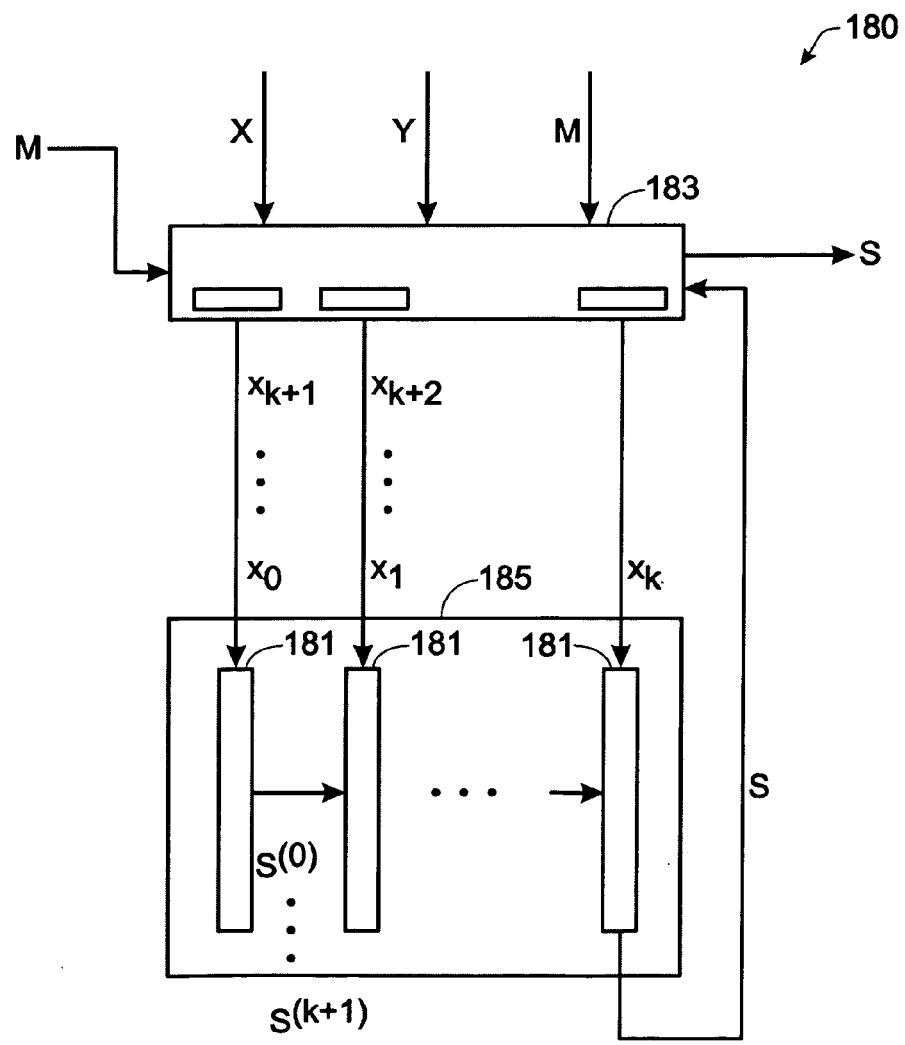
FIG. 1F is a schematic diagram of a MWR2MM processing module.
Figure 1B:
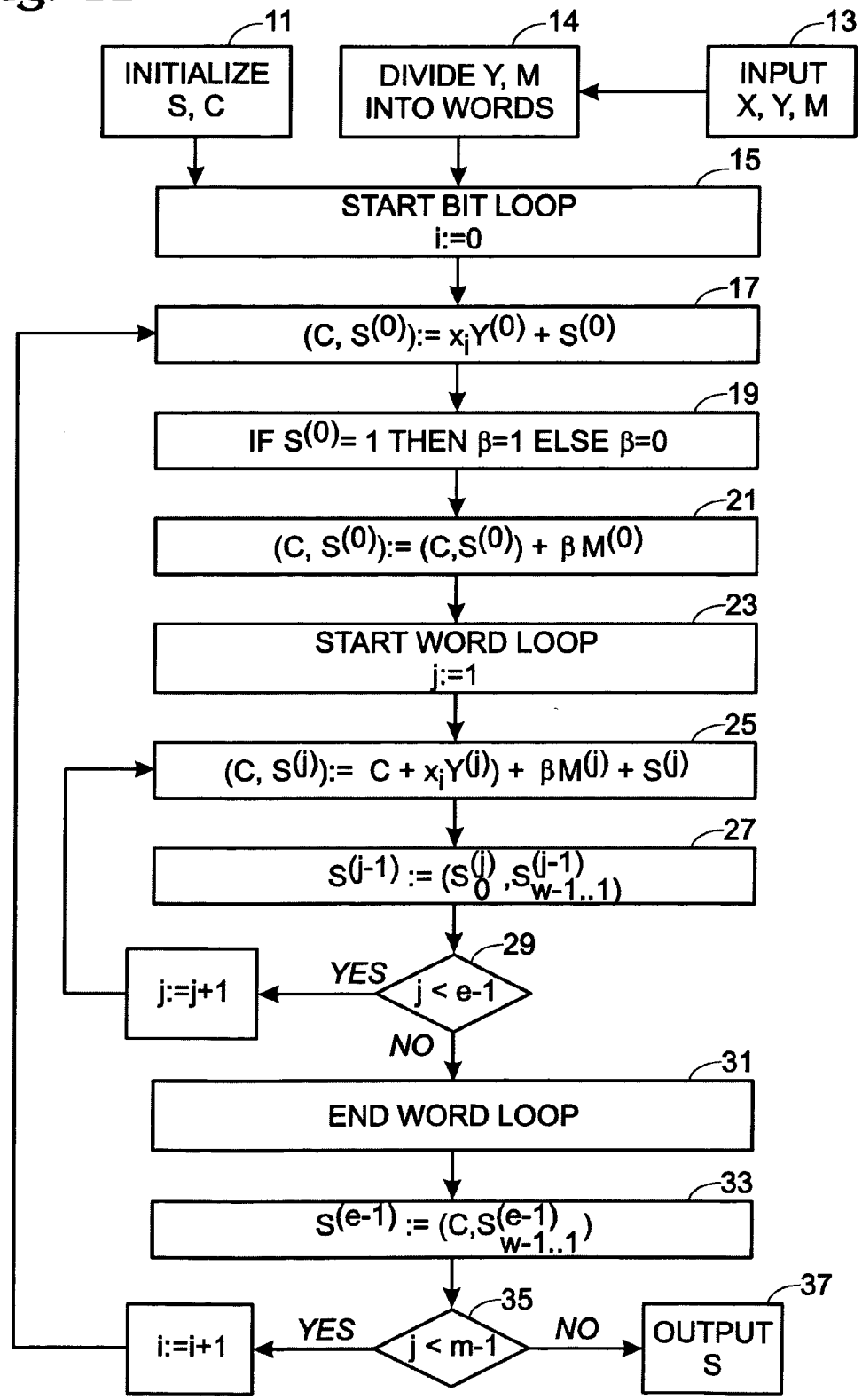
FIG. 1B is a block diagram of a multiple word, radix-2 Montgomery multiplication method ("MWR2MM").

FIG. 1B is a block diagram corresponding to the pseudocode of Table 1. For convenience, even-word and odd-word loops are combined using a variable β. An initialize block 11 resets S and C to initial values (typically 0), and an input block 13 receives the operands X, Y and the modulus M. A bit-loop start block 15 assigns an integer counter variable i a zero value, and a first computation block 17 produces a value of a concatenation (C, $S^{(0)}$). An even/odd test block 19 assigns the variable β a value of 0 if $S^{(0)}$ is even or 1 if $S^{(0)}$ is odd. A second computation block 21 then corrects a value of the concatenation (C, $S^{(0)}$). If β=0, then the computation block 21 can be skipped. A word loop start block 23 assigns a word counter variable j a value j=1. A concatenation (C, $S^{(j)}$) is then determined, followed by a bit-shift operation that is performed in a bit-shift block 27. A word-decision block 29 then determines if additional words of the operand Y require processing. If so, then the word counter j is incremented and the procedures of blocks 25, 27 are repeated. If all words of the operand Y are processed, then an (e–1)th word of S is calculated in a third computation block 33. A bit-decision block 35 then determines if additional bits of the operand X are needed. If so, then the bit counter i is incremented and control is transferred back to the block 17. If all bits of the operand X have been processed, then computation is complete and the Montgomery product S is output at an output block 37.

FIG. 1C is a block diagram of the method of FIG. 1B illustrating parallel and pipeline execution of a MWR2MM method using processing elements 71, 73 with additional processing elements that are not shown in FIG. 1C. For convenience, blocks performing functions similar to blocks of FIG. 1B are denoted with the same reference numerals. An intermediate value of a word $S^{(j-1)}$ is determined in the computation block 27 based on $x_0$, and this intermediate value remains unchanged as computations in the word loop for the current bit $x_i = x_0$ continue. Therefore, this word is delivered by an output block 41 as an input to a processing element 73 that executes computations using the bit $x_{i+1} = x_1$. As intermediate values of each word of the Montgomery product S are obtained based on the bit $x_i$, these words are output to a processing element for determining contributions based on $x_{i+1}$. This processing element need not wait for the $x_i$ bit loop to complete before beginning execution. Therefore, the block diagram of FIG. 1C illustrates that the MWR2MM method (and corresponding apparatus) permit several operations to begin execution simultaneously.

Figure 1D:
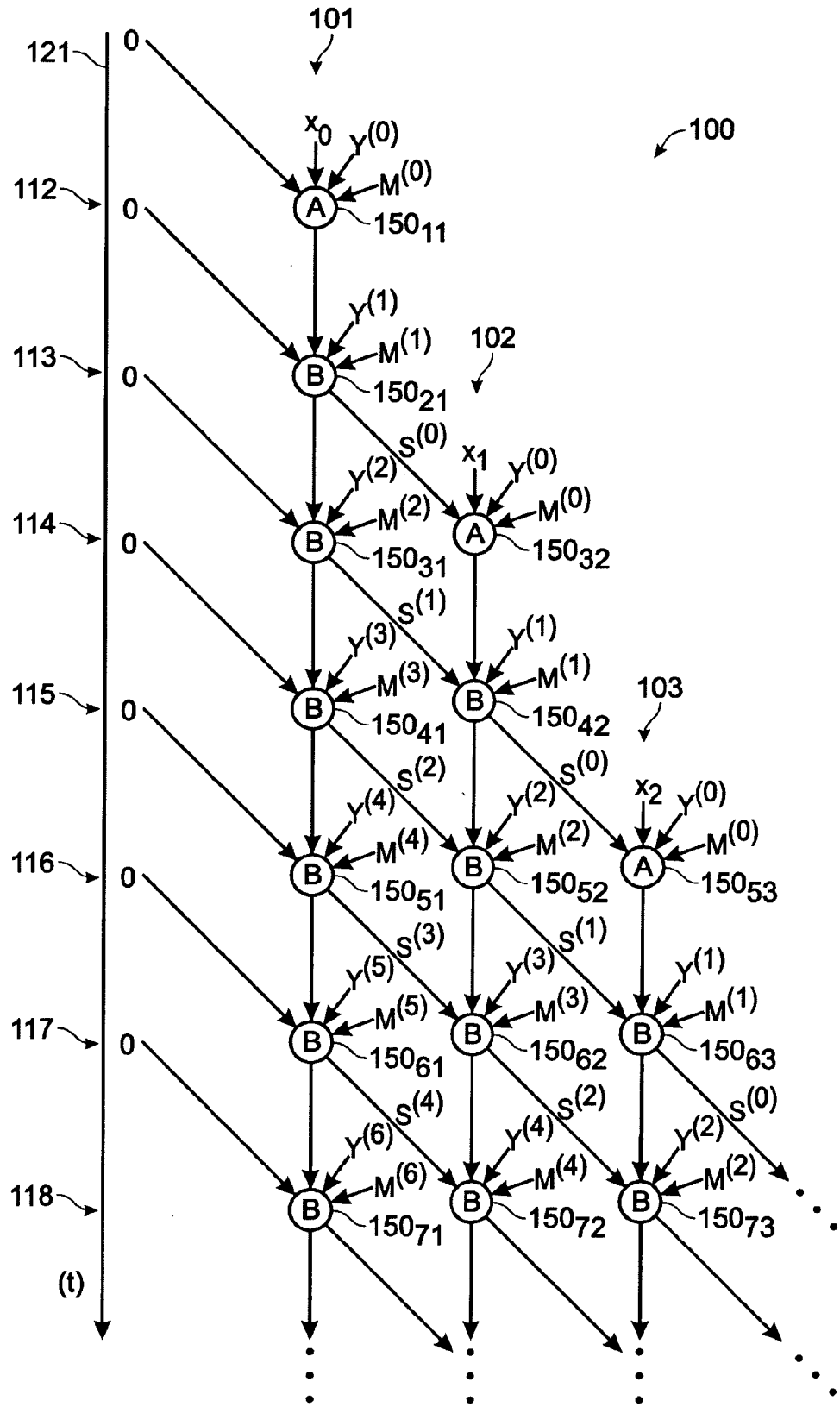
FIG. 1D is a dependency graph for a multiple-word, radix-2 Montgomery multiplication method.
Figure 1E:
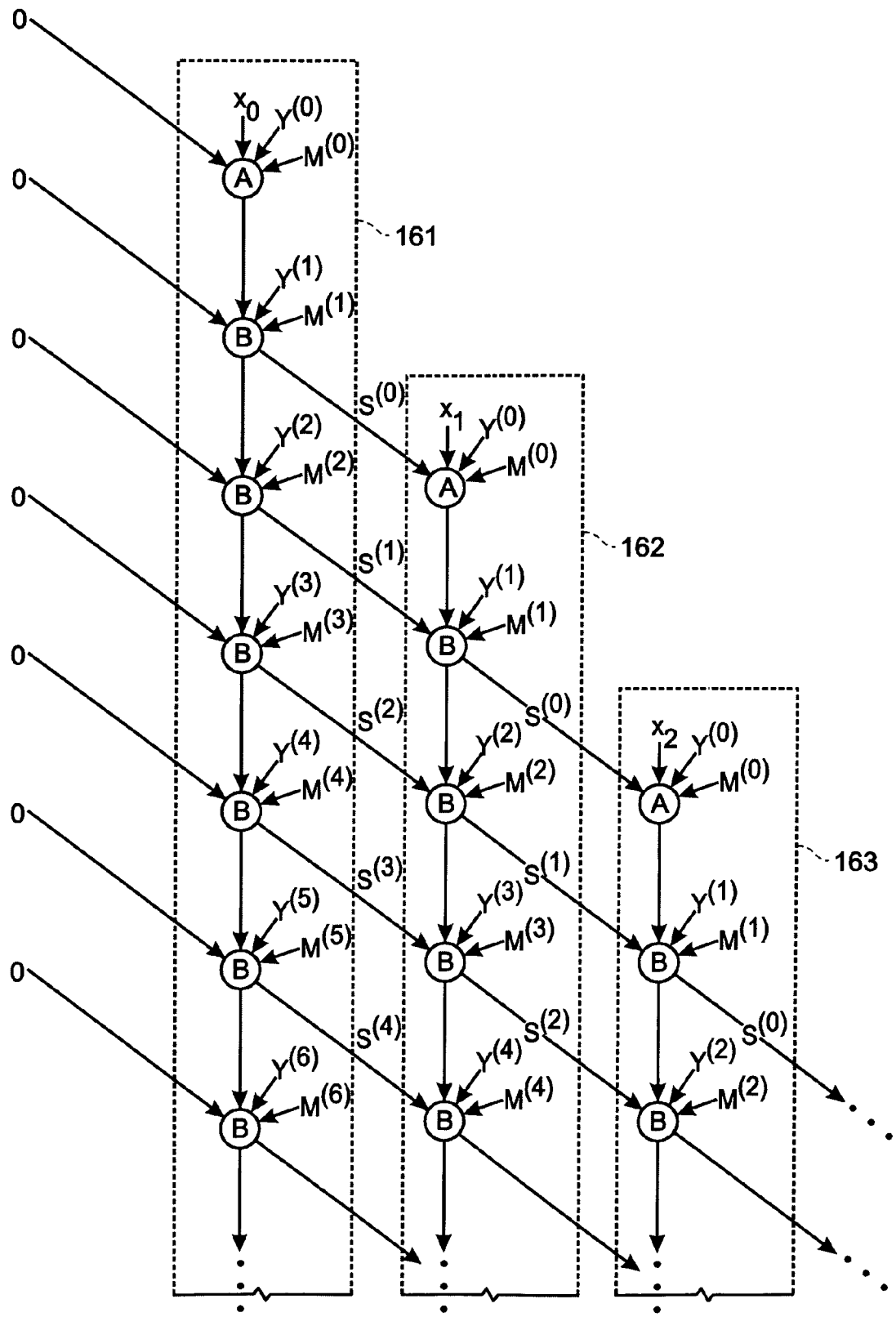
FIG. 1E is a schematic diagram illustrating processing elements ("PEs") that execute the MWR2MM method FIG. 1B and FIG. 1D.

Parallel and pipeline execution of the MWR2MM method are further illustrated in the dependency graph 100 in FIG. 1D. The dependency graph 100 illustrates the computation of the Montgomery product using two types of elemental tasks, identified in FIG. 1D as A-tasks and B-tasks. An A-task includes three operations: (1) testing a least significant bit of S to determine if M should be added to S (i.e., determining if S is even or odd); (2) addition of words selected from S, a product $x_i Y$, M, and a carry variable C, depending on whether S is even or odd; and (3) a one-bit right shift of the word S. A B-task includes steps (2) and (3) but does not include step (1). Referring to FIGS. 1B–1C, step (1) includes blocks 17, 19, 21; step (2) includes block 25; and step 3 includes blocks 27, 33. The A-tasks and B-tasks are typically executed with task processors such as integrated circuits or other hardware, or in software modules.

Step (1) includes assigning a concatenation (C, $S^{(0)}$) a value $x_i Y^{(0)} + S^{(0)}$, and then determining if the resulting $S^{(0)}$ is odd based on evaluation of a least significant bit $S_0^{(0)}$. If $S^{(0)}$ is odd, then $M^0$ is added to (C, $S^{(0)}$). The computations of step (2) also depend on whether $S^{(o)}$ is even or odd. For example, if a variable β is assigned a value 1 if $S^{(o)}$ is odd, and 0 otherwise, then step (2) can be written as $$(C, S^{(j)}) := C + x_i Y^{(j)} + \beta M^{(j)} + S^{(j)}$$

for both even and odd $S^{(o)}$. An (e−1)th word of S is obtained by skipping step (2) and performing the bit-shift operation of step (3) by a concatenation:

$$S^{(e-1)} := (C, S_{w-1..1}^{(e-1)}).$$

For convenience, the MWR2MM can be implemented with only A-tasks, wherein unnecessary computations performed by the A-tasks are disabled. Alternatively, a combination of both A- and B-tasks can be used, or combinations of other specialized tasks.

An example implementation of MWR2MM shown in FIG. 1D includes an array of A- and B-tasks $150_{I,J}$, arranged in columns 101, 102, 103 and rows 112, . . . , 118, wherein I is a row index and J is a column index. For simplicity, only three columns (J=1, . . . , 3) and 7 rows (I=1, . . . , 7) are shown. The rows 112, . . . , 118 are arranged in sequential time order of execution along a time (t) axis 121. The rows typically correspond to times associated with clock cycles of a processor or other hardware or software at which execution of the tasks of that row are initiated. For Montgomery multiplication of operands divided into e words of bit length m, as many as e·m tasks $150_{I,J}$ are used. In some cases, not all tasks $150_{I,J}$ are needed while in other cases, some of the tasks $150_{I,J}$ are used more than once. A degree of computational parallelism corresponds to a number of columns of tasks initiated at a selected clock cycle (i.e., in the same row), while a degree of computational pipelining corresponds to a number of rows of tasks that receive inputs from an earlier row in the same column. Referring to FIG. 1D, it is apparent that the MWR2MM supports extensive parallelism and pipelining.

Tasks $150_{I,J}$ in a selected column receive input data (a word of S) from a task in a left adjacent column and a previous row as arranged in FIG. 1D, and each row in the selected column receives as inputs words of Y and M, respectively. Only a single bit of the operand X is used in each column. For example, the tasks $150_{32}$, . . . , $150_{72}$ of the column 102 receive inputs $S^{(0)}$, . . . , $S^{(4)}$ from the tasks $150_{21}$, . . . , $150_{61}$, respectively. In addition, the tasks $150_{32}$, . . . , $150_{72}$ receive inputs $Y^{(0)}$, . . . , $Y^{(4)}$ and $M^{(0)}$, . . . , $M^{(4)}$, respectively, and the task $150_{32}$ receives the bit $x_1$.

As another specific example, the A-task $150_{11}$ receives inputs $x_0$, $Y^{(0)}$, and $M^{(0)}$. The task $150_{11}$ provides an output to a B-task $150_{21}$. The B-task $150_{21}$ receives inputs $Y^{(1)}$, $M^{(1)}$ and produces the word $S^{(0)}$ that is then delivered to the A-task $150_{32}$ and an output that is delivered to the B-task $150_{31}$.

As shown in FIG. 1D, tasks in each of the columns 101, 102, 103 in the dependency graph 100 can be computed with separate respective processing elements (PEs) 161, 162, 163, and the data generated from a selected PE can be communicated to another PE in pipeline fashion. For example, tasks $150_{11}$, $150_{21}$, . . . in the column 101 of FIG. 1D can be included in the PE 161 that provides intermediate values of the words of the Montgomery product S to the PE 162. A multiplier can consist of a set of PEs that include the various tasks. Each of the columns 101, 102, 103 in the dependency graph 100 includes e+1 tasks.

With reference to FIG. 1F, a MWR2MM processing module 180 includes a computation module 185 that includes processing elements 181. A control unit 183 receives the operands X, Y, the modulus M, and the number of bits m, and directs the words and bits of the operands to the computation module 185.

Figure 2:
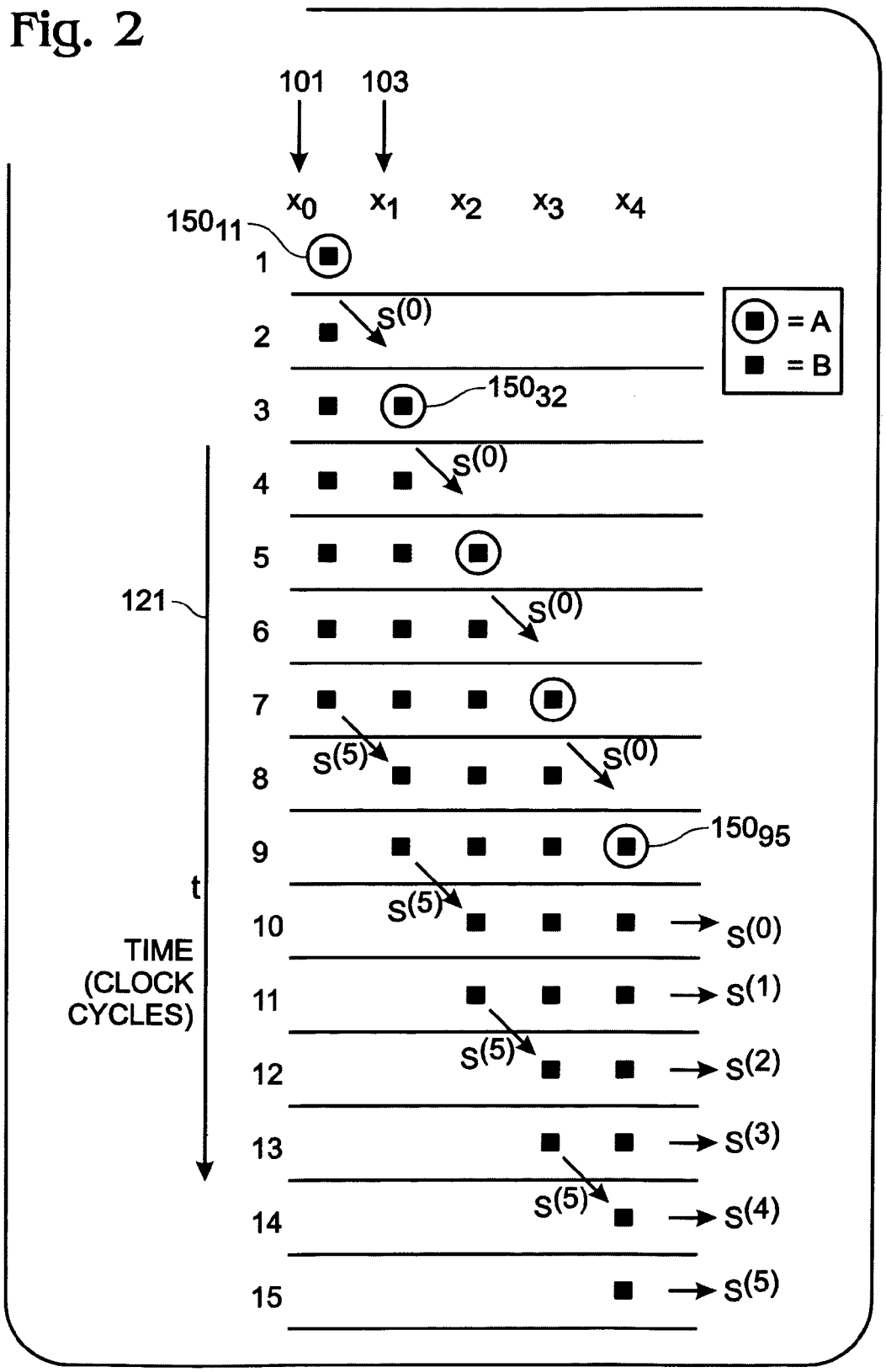
FIG. 2 illustrates parallel and pipelined computation of a Montgomery product of 5-bit operands having a word size of w=1 bit.

An example of computation with 5-bit operands (m=5) is shown in FIG. 2 for a word size w=1 bit and a number of words e=⌈(5+1)/1⌉=6. Since a $j^{th}$ word of each input operand is used to compute a $(j-1)^{th}$ word of the product S, the last B-task in each column receives $M^{(e)}=0$ and $Y^{(e)}=0$ as inputs. (Both M and Y include words 0, . . . e−1 so eth words are defined for convenience and assigned 0 values.) There is a delay of two clock cycles between processing a column for $x_i$ and a column for $x_{i+1}$. The total execution time for the computation shown in FIG. 2 is 15 clock cycles.

A-tasks and B-tasks can be performed with identical hardware modules by supplying an A-task module with $M^{(j)}=0$, or by providing an input for an even/odd parameter such as the parameter β of FIGS. 1B–1C. As indicated in the pseudocode of Table 1, the value of $S_0^{(o)}$ determines whether $S^{(o)}$ is even or odd and whether words of M are added by the tasks $150_{I,J}$. For convenience, only task modules that can execute both A-tasks and B-tasks can be used. Determination of which word loop is to be executed is controlled by a local control element that reads at least a least-significant bit of $S^{(o)}$ as the task module begins execution, and retains the value of $S^{(o)}$ while all words of an operand are scanned.

As noted above with reference to FIGS. 1B–1D, a MWR2MM method permits pipeline and parallel execution. As used herein a "pipeline cycle" is a sequence of steps that a PE executes to process all words of an input operand, and degree of parallelism is a number of PEs that simultaneously process an operand. A maximum degree of achievable parallelism $p_{max}$ is:

$$p_{max} = \left\lceil \frac{e+1}{2} \right\rceil. \quad (2)$$

Referring to FIG. 2, tasks $150_{I,J}$ are active simultaneously in only three columns, and $$p_{max} = \left\lceil \frac{6+1}{2} \right\rceil = 4.$$

Figure 3:
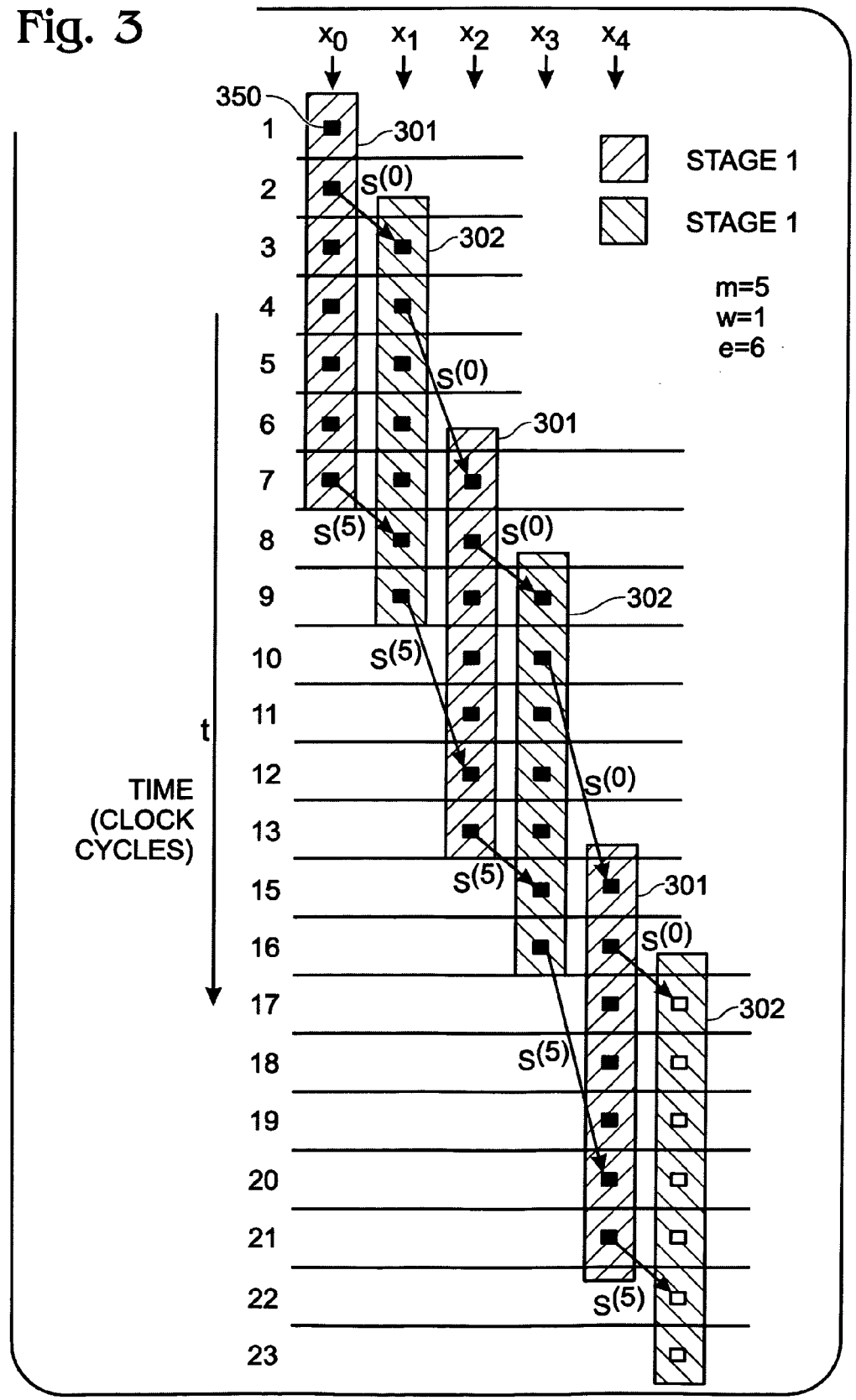
FIG. 3 is a schematic diagram illustrating Montgomery multiplication with 5-bit operands and two pipeline stages.

If fewer than $p_{max}$ PEs are available, then total execution time increases, but full precision computation can still be performed. FIG. 3 illustrates performing the computation of FIG. 2 with a PE 301 and a PE 302, each including tasks 350. The PE 301 receives the bit $x_0$ in a first clock cycle (t=1) and supplies $S^{(o)}$ to the PE 302 in a third clock cycle (t=3). The PE 302 produces an output $S^{(o)}$ that is available at a fourth clock cycle (t=4), but during this clock cycle the PE 301 is still computing the contributions of $x_0$ to S and is not ready to begin additional computations. However, in the clock cycle t=7, the PE 301 completes the $x_0$ computations, and in the clock cycle t=8 the PE 301 is ready begin computation of the $x_2$ contribution to S. Therefore, the output $S^{(o)}$ is buffered (stored) for three clock cycles and then delivered to the PE 301. At clock cycle t=11, the PE 302 is ready to supply $S^{(o)}$ to the PE 301, but the PE 301 is not ready to receive $S^{(o)}$ until clock cycle t=15, and $S^{(o)}$ is buffered again. As shown in FIG. 3, the computation performed by PE 302 that begins at clock cycle t=17 (the last pipeline cycle) is wasted, because m is not a multiple of 2, i.e., there is no bit $x_5$.

A total computation time T (in clock cycles) for computation using n PEs, wherein $n \leq p_{max}$, is:

$$T = \begin{cases} 2kn + e - 1 & \text{if } (e+1) \leq 2n, \\ k(e+1) + 2(n-1) & \text{otherwise,} \end{cases} \quad (3)$$

wherein $$k = \left\lceil \frac{m}{n} \right\rceil,$$

wherein n is a number of pipeline stages. With n units, an average utilization U of each PE is found as $$U = \frac{\text{Total number of time slots per bit of } X \times m}{\text{Total number of time slots} \times n} = \frac{m(e+1)}{Tn}. \quad (4)$$

If $(e+1) \leq 2n$, then the first word of the product S is produced by the pipeline at time 2kn since each pipeline cycle starts in periods of 2n clock cycles. Once the first word is generated, the remaining e−1 words are generated to complete computation. If $(e+1) > 2n$, the first word of the product S is generated before the first PE in the pipeline is free to start another pipeline cycle. In this case, the product S (i.e., an intermediate value thereof) is buffered until another pipeline cycle can be started. A period between pipeline cycles is typically (e+1) clock cycles.

FIGS. 4A–4C illustrate total execution time T, utilization U, and speedup relative to a single PE, respectively, as a function of operand precision (i.e., the number of operand bits). As shown in FIG. 4C, speedup is defined as a ratio of execution time for Montgomery multiplication using two or three PEs to an execution time using a single PE. In FIGS. 4A–4C, T, U, and speedup are considered for operand precisions of up to 100 bits and for implementations using up to three PEs for a fixed word size w=8 bits. The overhead of the pipelined organization becomes insignificant for precisions m≥3w, and a significant speed improvement is obtained even for low precision operands. In FIG. 4B, utilization of a single PE is 100% for operands of any precision.

Figure 5:
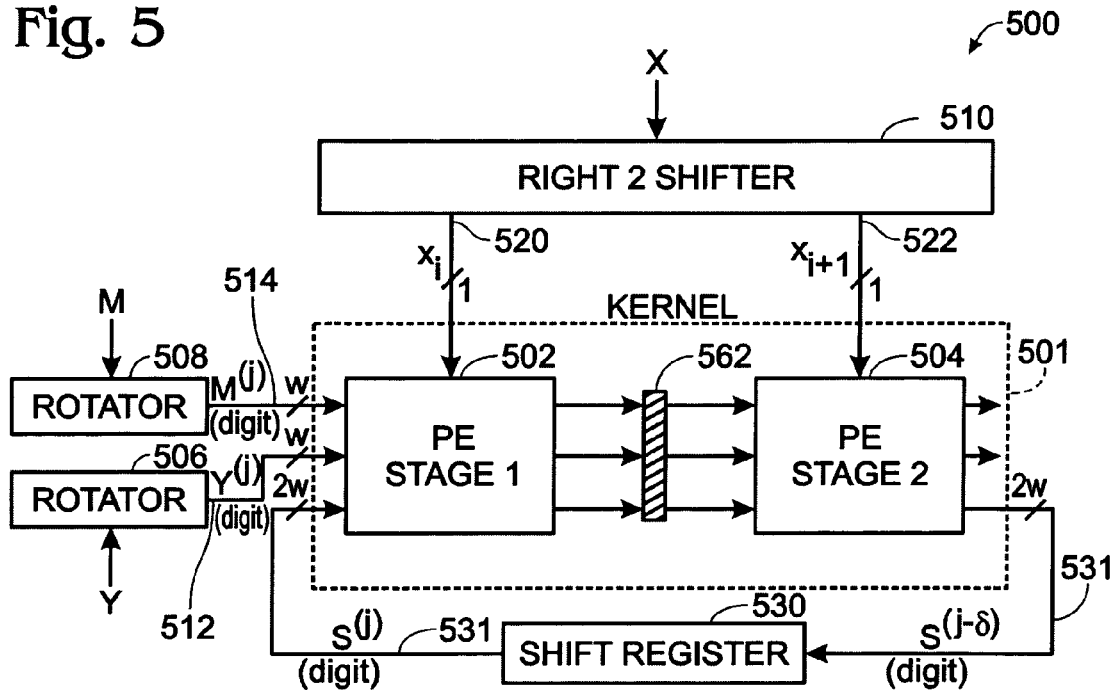
FIG. 5 illustrates pipelined processor organization with 2 processing elements.

With reference to FIG. 5, a two-stage pipeline 500 includes a kernel 501 comprising PEs 502, 504 that receive bits of the operand X along respective 1-bit-wide data paths 520, 522 from a p-shift register 510, wherein p equals the number of PEs in the pipeline 500. As shown in FIG. 5, p=2. The pipeline 500 also includes register files (registers) 506, 508 that store values of the operand Y and the modulus M, respectively, and supply words $Y^{(j)}$ and $M^{(j)}$, respectively, to the PE 502 on respective w-bit-wide data paths 512, 514. Since the modulus M and the operand Y are received word-serially by the kernel 501, the registers 506, 508 operate as rotators. In order to simplify the control logic, an extra word assigned a zero value is inserted to supply the input to the PEs 502, 504 for the last execution of task B. The PE 502 transmits data to the PE 504.

Words $S^{(i)}$ of the Montgomery product S are supplied to a register file 530 by the PE 504 and to the PE 502 by the register file 530. The register file 530 is preferably a shift register, because the contents of the register 530 are used only once and then are discarded. A length (L) of the register file 530 depends on the number of words (e) in the operand Y and a number of stages (n) in the pipeline, and can be computed as:

$$L = \begin{cases} e + 2 - 2n & \text{if } (e+2) > 2n \\ 0 & \text{otherwise} \end{cases} \quad (5)$$

For example, with reference to FIG. 3, computations using 5 word operands (e=5) having 1-bit words with 2 PEs (n=2) require buffering for up to 3 clock cycles, or L=3.

The registers 506, 508, 510, 530 require no more circuit area than conventional radix-2 Montgomery multiplication hardware and can be implemented by connecting memory elements to each other in a chain or loop without impacting the system clock rate. Because rotators must be loaded, multiplexers (MUXes) can be used between memory elements. Delay caused by such MUXes does not create a critical path. To reduce the number of MUXes, M and Y can be loaded serially during a last pipeline cycle. In this case, MUXes are used between memory elements of the rotator only.

A global control block is not shown in FIG. 5, but such a control block controls inputs and outputs corresponding to control flow in the block diagram of FIG. 1B, the dependency graph 100 of FIG. 1D, and the pseudocode of Table 1. The global control block controls transfer of data to and from flip-flops 562 that receive data from the PE 502 and hold the data until the data is clocked to the PE 504.

Figure 6:
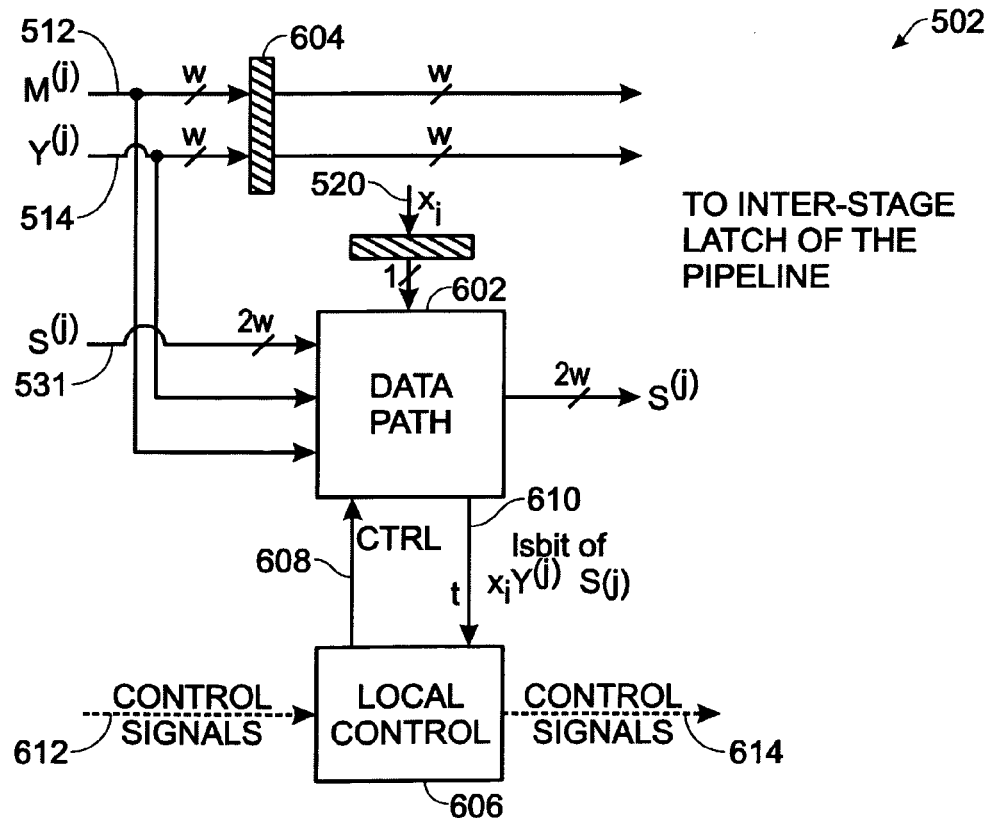
FIG. 6 is a block diagram of a processing unit.

A functional block diagram of the PE 502 is shown in FIG. 6. A data path 602 receives a word $S^{(j)}$ of the operand S from the register 530 (shown in FIG. 5) and words $M^{(j)}$ and $Y^{(j)}$ of the modulus M and the operand Y. Additional contributions to $S^{(j)}$ are calculated based on products with the bit $x_i$. Flip-flops 604 clock $M^{(j)}$ and $Y^{(j)}$ to the PE 504 (shown in FIG. 5) when a new value of S(i) is available and the PE 504 is ready to accept new data. A local control unit 606 delivers a control signal ctrl to the data path 602 on a control path 608 and receives a least significant bit lsbit of $S^{(j)} + x_i Y^{(j)}$ along a path 610. The value of lsbit is used to control the addition of words of the modulus M via a control signal ctrl that also controls storage of the value of lsbit during the pipeline cycle. Control signals are communicated to and from control units of other PEs via a control input 612 and a control output 614.

To reduce storage and arithmetic hardware complexity, M, X, and Y can be represented in a non-redundant form. The intermediate Montgomery product S is represented in a redundant carry-save (CS) form. With this representation, 2w bits per word are transferred between PEs in each clock cycle, w bits for a sum word and w bits for a carry word. Other representations of M, X, and Y are satisfactory as well.

Figure 7A:
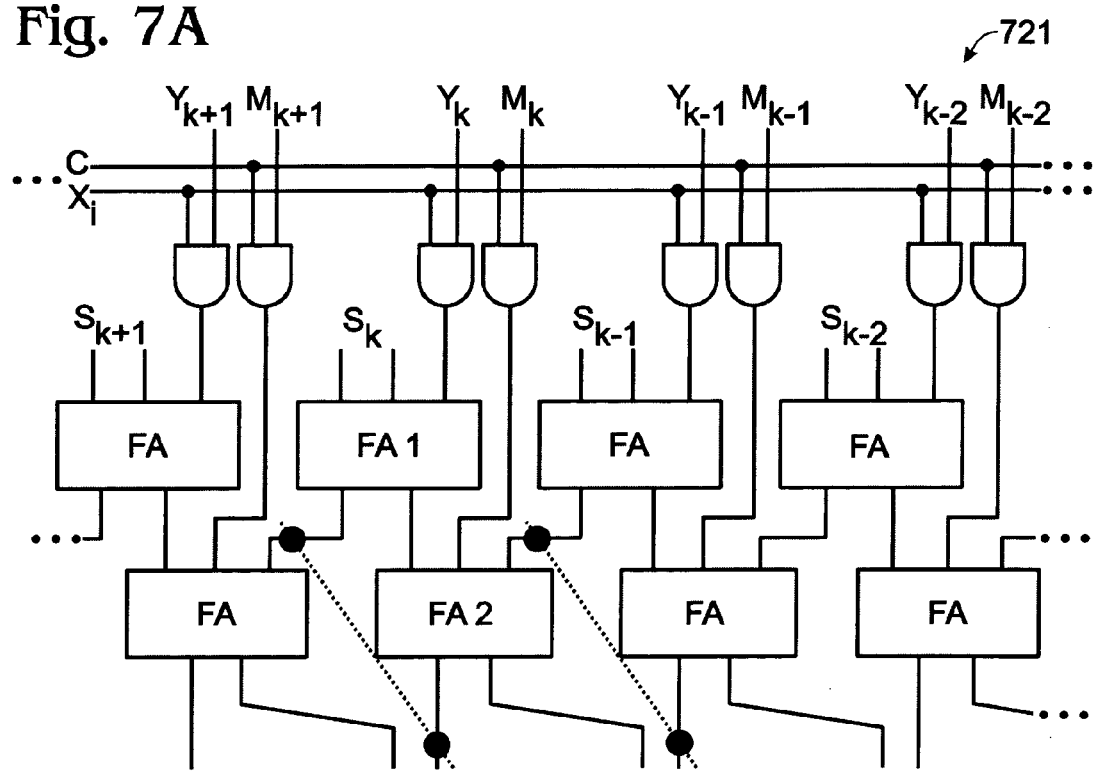
FIG. 7 is a block diagram illustrating serial computation of the MM operations.
Figure 7B:
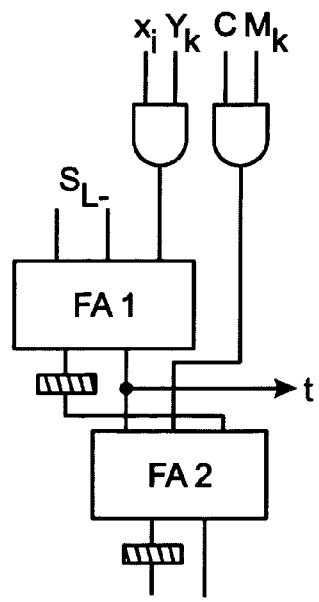

The data-path design of FIG. 6 is similar to data-path designs presented in A. F. Tenca, *Variable Long-Precision Arithmetic (VLPA) for Reconfigurable Coprocessor Architectures*, Ph.D Thesis, University of California at Los Angeles, March 1998, but modified for least-significant-digit-first computation. The data path 602 typically includes two layers of carry-save adders (CSA). Assuming a full-precision adder architecture as shown in FIG. 7A, a retiming process shown for the case w=1 to generate the serial circuit design is presented in FIG. 7B. For w>1, larger groups of adders are considered, based on the same approach. The cycle time may increase for larger w a result of the broadcast problem only but does not depend on the arithmetic operation itself. The high-fanout signals in the design are $x_i$ and ctrl, and both change value only once for each pipeline cycle. The bit-right shift that is performed by the data path is already included in the CSA structure shown in FIGS. 7A–7B.

Figure 8:
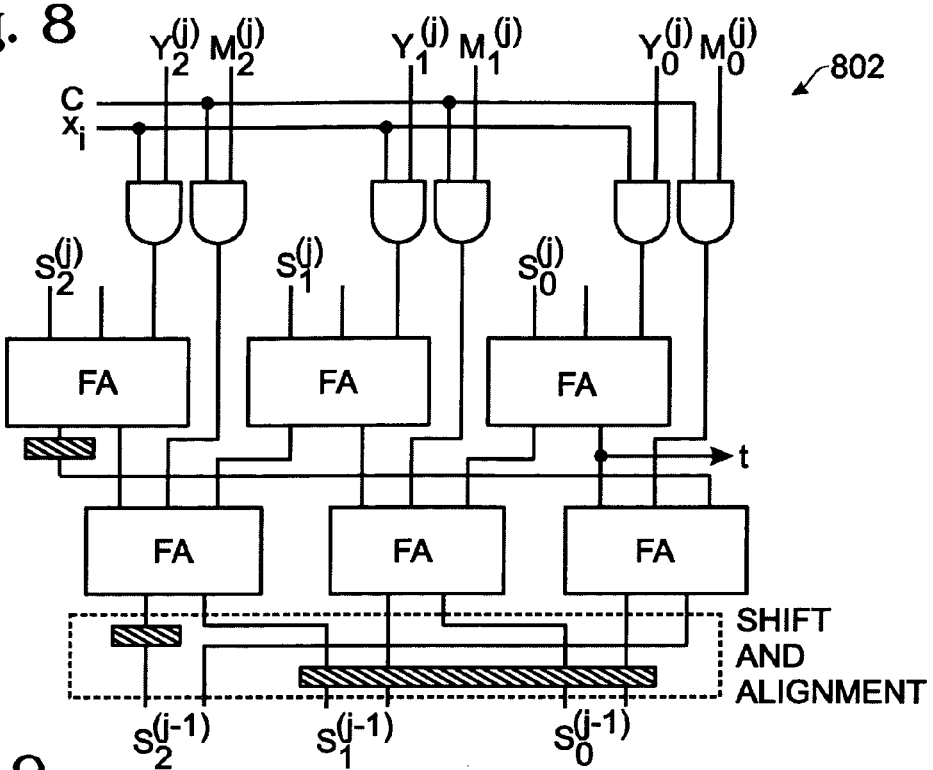
FIG. 8 is a block diagram of a data path for w=3 bits.

A representative data-path design 802 for w=3 is shown in FIG. 8. It has a shift and alignment section to generate the next word of S. When computing the bits of word j (step j), the circuit generates w=1 bits of $S^{(j)}$, and the most significant bit of $S^{(j-1)}$. The bits of $S^{(j-1)}$ computed at step j−1 are delayed and concatenated with the most significant bit generated at step j ("alignment").

Designs for a specific Montgomery multiplier using a MWR2MM method can be selected based on a combination of chip area and execution time that both depend on operand precision m, word size w, and pipeline organization. The chip area A can be selected as a design constraint. For convenience, chip area occupied by interconnections such as wiring can be disregarded. The propagation delay of a PE can be assumed to be approximately independent of the word size w (a reasonable approximation, especially for small w). Using this assumption, the clock cycle time is approximately the same for all designs, and a speed comparison can be based on the number of clock cycles required to complete a multiplication. Chip areas used by registers for the intermediate sum, the operands, and the modulus are typically the same or nearly so for all designs.

The MWR2MM method of Table 1 has a worst-case execution time for w=m, because in this case extra cycles are introduced to allow word-serial computation, but no word-serial computation is performed. Therefore, to compare designs, a chip area is selected that is inadequate to implement full-precision Montgomery multiplication and designs having different organizations are compared. Using a very-high-speed integrated-circuit design language (VHDL) with Mentor Graphics design tools to design in a 1.2 μm CMOS technology, cell area $A_{cell}(w)$ as a function of word size w is approximately:

$$A_{cell}(w)=47.2w,$$

wherein the constant 47.2 is an area cost per word. For comparison, a similar calculation for a 2-input NAND gate corresponds to a total area cost of 0.94.

When using a pipelined organization, areas $A_{latch}(w)$ of inter-stage latches can be significant and are calculated to be approximately $A_{latch}(W)$=33.28w. A pipeline area $A_{pipe}$ of a pipeline with n stages is approximately:

$$A_{pipe}(n,w)=(n-1)A_{latch}(w)+nA_{cell}(w)=80.48nw-33.28w. \quad (6)$$

The maximum word size that can be used in a particular design ($w_{max}$) is a function of the available area A and the number of pipeline stages n, and is calculated as:

$$A_{pipe}(n, \omega) \leq A \quad (7)$$

$$80.48n\omega - 33.28\omega \leq A$$

$$\omega \leq \frac{A}{80.48n - 33.28}$$

$$\omega_{max}(A, n) = \left\lfloor \frac{A}{80.48n - 33.28} \right\rfloor.$$

Based on $w_{max}$, a total execution time (in clock cycles) for operands with precision m is obtained from Equation 3 considering that $$e = \left\lceil \frac{m+1}{\omega_{max}(A, n)} \right\rceil.$$

Figure 9:
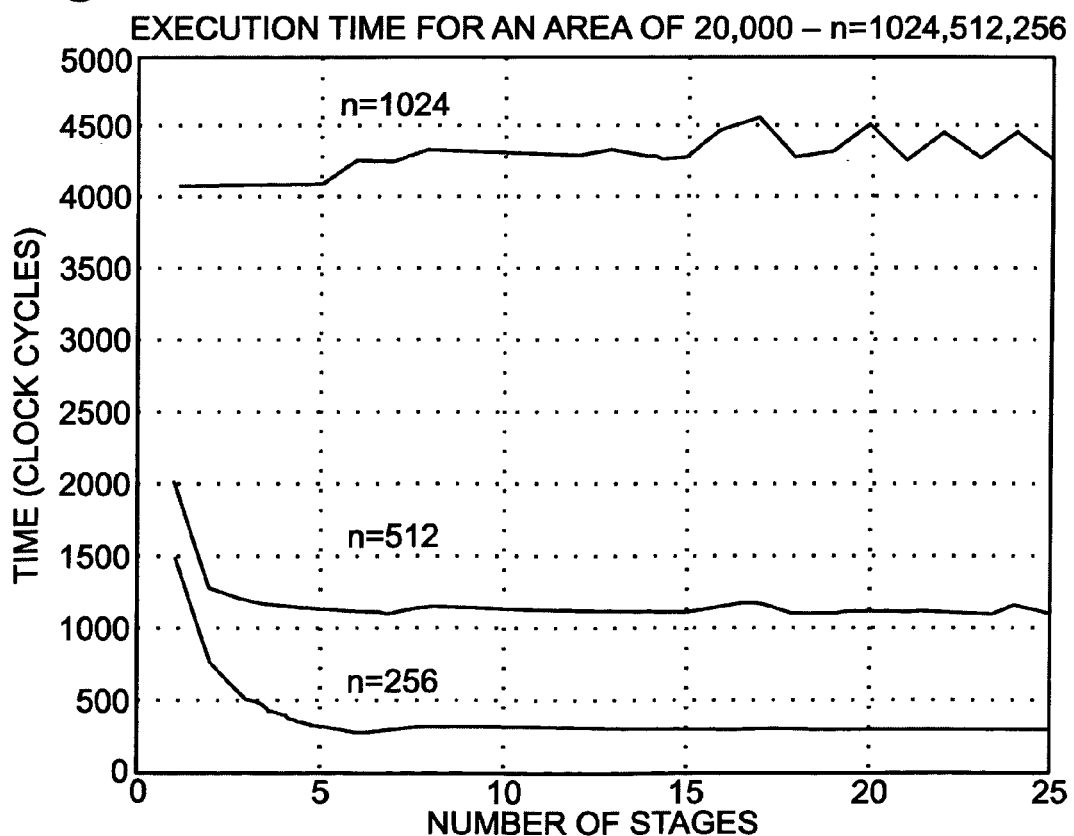
FIG. 9 is a graph of execution time of the MM hardware for various precision and configurations.

For a given chip area $A_{chip}$, different organizations are evaluated to select an organization that has the shortest computation time. Referring to FIG. 9, computation time is plotted as a function of a number of pipeline stages for $A_{chip}$=20,000. The number of stages that provides the best performance varies with the precision (i.e., number of bits m) required in the computation. For the cases shown, five stages provides good performance. The number of stages is typically limited so that: (1) high utilization of the processing elements is achieved only with very high precision operands, and (2) undesirable oscillations in execution time such as those shown in a rightmost part of the curve of FIG. 9 for m=1024 are avoided. These oscillations are the result of: (a) a word size w that is not a good divisor of m, producing a most significant word having few significant bits, and (b) a poor match between the number of words e and n, causing a low utilization of the pipeline stages.

TABLE 2

Number of pipeline stages versus the word size for a fixed chip area $A_{chip}$ = 20,000.

| n (stages) | 1 | 2 | 3 | 4 | 5 | 6 | 7 | 8 | 9 | 10 |
|---|---|---|---|---|---|---|---|---|---|---|
| w (bits) | 423 | 156 | 96 | 69 | 54 | 44 | 37 | 32 | 28 | 25 |

For a fixed chip area $A_{chip}$, word size becomes a function of the number of PEs. The word size decreases as the number of stages in the pipeline increases. The word size for some values of n is given in Table 2 for a fixed chip area $A_{chip}$=20,000.

Using Mentor Graphics VHDL design tools, a minimum clock cycle time of 11 ns (a clock frequency of 90 MHz) is obtained for a MWR2MM multiplier that performs Montgomery multiplication of m=1024 bit operands with n=5 stages and w=54 bit words. A total execution time is approximately 4100·11=45, 100 ns. A correction step is not included in this estimate, and such a step requires another pipeline cycle.

The Montgomery multiplication methods and apparatus described above permit scalable Montgomery multiplication in which operand size is not limited to a predetermined bit precision. These methods and apparatus can be adjusted to an available chip area and are readily adaptable, permitting consideration of design trade-offs with respect to performance parameters such as chip area and execution time. Typically, a pipeline processor that includes several processing elements exhibits superior performance than a single processing element that uses a large word length. By dividing operands into words, a large number of PEs can be used, and consequently the data paths can be reduced in size, reducing the necessary data path bandwidth. An example Montgomery multiplier fabricated in a CMOS technology can execute at a clock rate of up to 90 MHz. The total time to compute a Montgomery product for a given operand precision depends on the available chip area and the chosen pipeline configuration. The upper limit on the precision of the operands is dictated by the memory available to store the operands and any internal results.

These scalable methods and apparatus have application to encryption and decryption systems used to provide computer data security and secure transmission of data, including financial data and text, over insecure communication channels such as the Internet and wireless systems such as cellular telephone systems. In addition, systems for user authentication use Montgomery multiplication methods. Such systems are important in many applications, but especially in financial transactions in which it is critical to determine that a particular user has authorized a particular purchase or fund transfer. These systems represent text messages, numerical data (such as financial data), or user access information (e.g., passwords, public keys, private keys, authentication codes, or other encryption/decryption parameters) as words comprising a series of binary bits. These words are referred to herein as "messages" for convenience. These messages can be manipulated using the above methods and apparatus to facilitate encryption and decryption.

Figure 10:
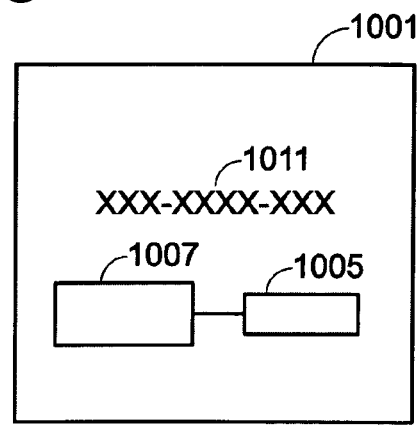
FIG. 10 is a block diagram of a smart card that includes a cryptographic module that implements a MWR2MM method.

Cryptographic systems and apparatus can include modules (hardware) or software components that perform necessary operations for a MWR2MM method as described above. Such modules can include dedicated (application-specific) integrated circuits or other processing hardware. Alternatively, the Montgomery operations can be implemented in software that is executed on a general purpose microprocessor. For example, as shown in FIG. 10, a smart card 1001 includes a cryptographic module 1007, typically implemented as a combination of hardware and software and a user identifier 1011. The cryptographic protocols used by the smart card 1001 are implemented by the cryptographic module 1007 that is in communication with a processor module 1005 that implements various mathematical operations associated with encryption and decryption. The processor module 1005 includes hardware, software, or a combination of hardware and software for determining Montgomery products using the MWR2MM.

Whereas the invention has been described in connection with several example embodiments, it will be understood that the invention is not limited to these embodiments. On the contrary, the invention is intended to encompass all alternatives, modifications, and equivalents as may be included within the spirit and scope of the invention as defined by the appended claims.

What is claimed is:

1. A computer-readable medium containing computer-executable instructions for performing a method of obtaining a Montgomery product of a first cryptographic parameter X and a second cryptographic parameter Y with respect to a modulus M, wherein X and Y are represented by m bits, the method comprising:

selecting a word length w and a number of words e;

representing the second cryptographic parameter and the modulus M as e words of length w, wherein e is at least 2; and obtaining an intermediate value of a first word of the Montgomery product based on a product of a word of the second cryptographic parameter, a word of the modulus, and a bit of the first cryptographic parameter.

2. A computer-implemented method for secure communication of a message to a message recipient, the method comprising:

receiving the message from a message sender;

obtaining a Montgomery product of a first cryptographic parameter X and a second cryptographic parameter Y with respect to a modulus M, wherein X and Y are represented by m bits and at least one of the first cryptographic parameter and the second cryptographic parameter is based on the received message, wherein the Montgomery product is obtained by a method comprising:

selecting a word length w and a number of words e;

representing the second cryptographic parameter and the modulus M as e words of length w, wherein e is at least 2; and obtaining an intermediate value of a first word of the Montgomery product based on a product of a word of the second cryptographic parameter and a bit of the first cryptographic parameter.

3. The computer-implented method of claim 2, wherein a product of the word length w and the number of words e such that $w \cdot e \geq m$.

4. The computer-implemented method of claim 2, further comprising obtaining an intermediate value of a second word of the Montgomery product based on a product of a second word of the second cryptographic parameter and a second bit of the first cryptographic parameter in parallel with obtaining the intermediate value of the first word.

5. The computer-implemented method of claim 2, further comprising updating the intermediate value of the first word of the Montgomery product with a contribution from at least one product of a second selected bit of the first cryptographic parameter with at least a second selected word of the second cryptographic parameter.

6. The computer-implemented method of claim 2, further comprising obtaining the intermediate value of the first word of the Montgomery product based on the product of a word of the second cryptographic parameter, a word of the modulus, and a bit of the first cryptographic parameter.

7. A computer-readable medium containing instructions for performing a method of obtaining a Montgomery product of a first cryptographic parameter X and a second cryptographic parameter Y with respect to a modulus M, wherein X and Y are represented by m bits, the method comprising:

selecting a word length w and a number of words e;

representing the second cryptographic parameter and the modulus M as e words of length w, wherein e is at least 2;

obtaining an intermediate value of a first word of the Montgomery product based on a product of a word of the second cryptographic parameter and a bit of the first cryptographic parameter; and updating the intermediate value of the first word of the Montgomery product with a contribution from at least one product of a second selected bit of the first cryptographic parameter with at least a second selected word of the second cryptographic parameter.

8. A computer-readable medium containing instructions for performing a method of obtaining a Montgomery product of a fist cryptographic parameter X and a second cryptographic parameter Y with respect to a modulus M, wherein X and Y are represented by m bits, the method comprising:

selecting a word length w and a number of words e;

representing the second cryptographic parameter and the modulus M as e words of length w, wherein e is at least 2; and obtaining an intermediate value of a first word of the Montgomery product based on a product of a word of the second cryptographic parameter and a bit of the first cryptographic parameter.

9. An apparatus for performing a Montgomery multiplication of a first operand and a second operand with respect to a modulus, the apparatus comprising:
   a plurality of processing elements that include inputs for words of the first operand, words of the modulus, an intermediate value of a word of a Montgomery product, and an input for a bit of the second operand; and
   a control unit situated and configured to direct words of the first operand, words of the modulus, and bits of the second operand to the processing elements, wherein the processing elements include task processors that receive words of the first operand, words of the modulus, and produce intermediate values of word of a Montgomery product.

10. The apparatus of claim 9, further comprising a data path along which words of the first operand are delivered to the processing elements.

11. A cryptographic processor, comprising:
   an input for a message; and
   an apparatus for obtaining a Montgomery product as recited in claim 9 that produces a Montgomery product based on the message.

12. A task processor for obtaining a Montgomery product of a first operand and a second operand with respect to a modulus M, the task processor comprising:
   an input configured to receive a bit of the first operand;
   an input configured to receive a word of the second operand;
   an input configured to receive a word of the modulus;
   a computational unit that determines a contribution to a final or intermediate value of a word the Montgomery product based on the received bit of the first operand and the received words of the second operand and the modulus; and
   an output configured to supply a final or intermediate value of the word of the Montgomery product.

13. A cryptographic processor, comprising a plurality of task processors as recited in claim 12 and configured to determine a Montgomery product.

14. A smart card, comprising a cryptographic processor configured to determine a Montgomery product of a first cryptographic parameter X and a second cryptographic parameter Y with respect to a modulus M, wherein X and Y are represented by m bits, by a method comprising:
   selecting a word length w and a number of words e;
   representing the second cryptographic parameter and the modulus M as e words of length w, wherein e is at least 2; and
   obtaining an intermediate value of a first word of the Montgomery product based on a product of a word of the second cryptographic parameter and a bit of the first cryptographic parameter.

15. The smart card of claim 14, wherein the first cryptographic parameter and the second cryptographic parameter are equal.

16. The smart card of claim 14, wherein the first cryptographic parameter corresponds to a user authentication code.

* * * * *